J. A. SWINEHART.
METHOD OF MAKING VEHICLE TIRES.
APPLICATION FILED NOV. 6, 1920.
1,426,927.
Patented Aug. 22, 1922.
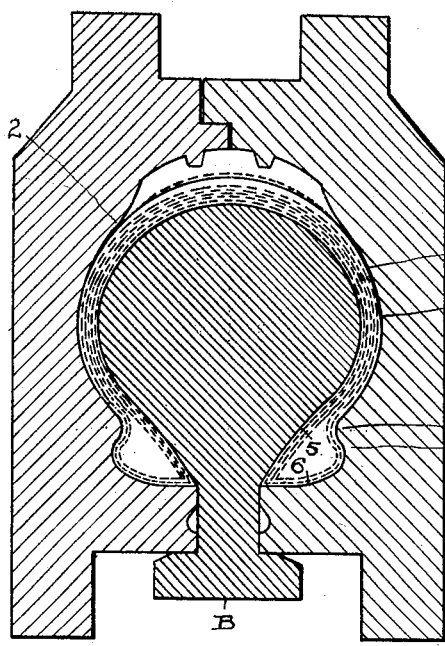
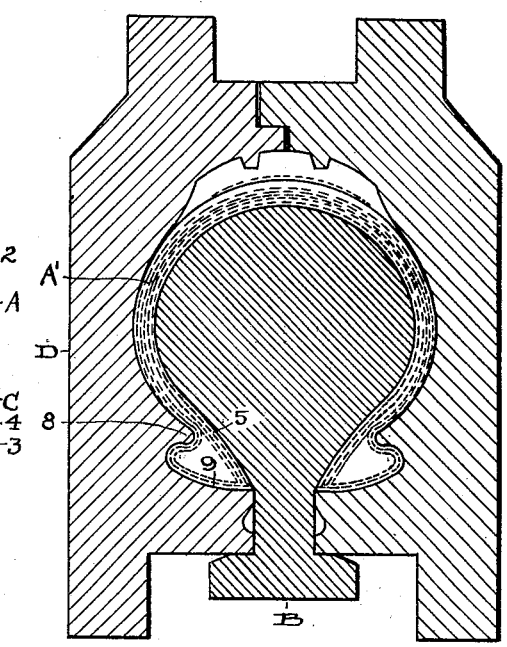
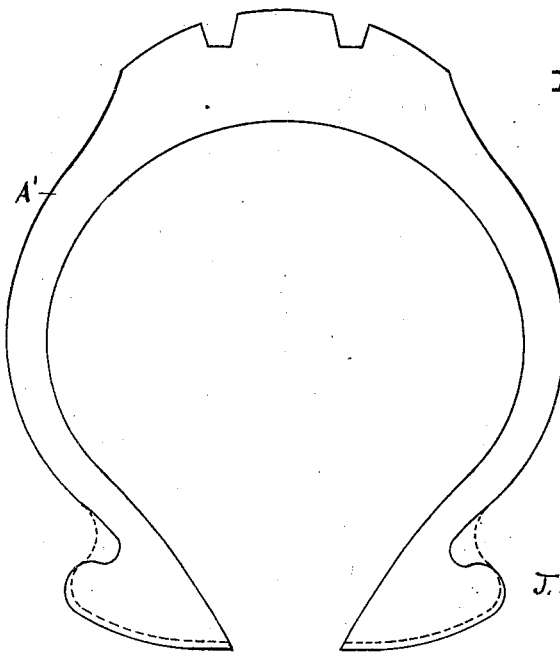
Inventor
J. A. Swinehart
Attorneys

UNITED STATES PATENT OFFICE.

JAMES A. SWINEHART, OF AKRON, OHIO.

METHOD OF MAKING VEHICLE TIRES.

1,426,927. Specification of Letters Patent. Patented Aug. 22, 1922.

Application filed November 6, 1920. Serial No. 422,164.

*To all whom it may concern:*

Be it known that I, JAMES A. SWINEHART, a citizen of the United States, residing at Akron, in the county of Summit and State of Ohio, have invented certain new and useful Improvements in a Method of Making Vehicle Tires, of which the following is a specification.

This invention relates to a method of making vehicle tires, especially casings having clencher beads, and the steps taken produce in the end a casing of the desired form without faults or malformation and permit the production of such casings in large quantities without variation in form and quality.

In making tire casings according to well known practices, using rigid metal molds, a certain percentage of imperfect casings will be produced, but notwithstanding, there are also advantages to be derived by the use of such molds. My object is to employ such molds to derive the advantages gained by their use, and to modify the steps heretofore taken so as to prevent the production of imperfect casings and to minimize the losses.

Thus, in the accompanying drawing, Figs. 1 and 2 represent two different molds, each figure being a cross section through a divided mold and a core within the mold. The cores in said figures are identical, and in practicing the method the core in the mold in Fig. 1 is transferred with the unfinished product to the mold in Fig. 2. The larger diagrammatic view,—Fig. 3—, illustrates in full and dotted lines the form given to the casing by the two molds shown in Figs. 1 and 2, respectively.

In practicing my method, a tire casing A is built up step by step on an annular core B in the usual manner until the requisite number of plies of woven fabric or cord stock, together with the beading material and the tread of rubber, produce a beaded casing of a given thickness and weight corresponding roughly in outline to the finished product but slightly oversize.

This initial product A, together with the iron core B, is placed within a divided cast-metal mold C having counter-part molding recesses 2 in their respective meeting faces, the contour and dimensions of these molding recesses being substantially the same as desired in the final product excepting at the bead forming portions 3. Here the ridge or shoulder 4 in the mold which produces the clencher channel in the side of the casing is rounded on a sweeping curve and the space between this ridge or shoulder 4 and the sloping side 5 of core B is relatively wide and flaring to produce an oversized or over-thick wall in the tire at this point and permit an unobstructed movement of the bead stock toward the base portion 6. On the other hand the base portion 6 of the molding cavity which forms the seating portion for the tire, is of slightly less depth than that required to give the tire its true and final size; in other words this product will be too large at its inner diameter to properly fit a clencher rim of standard size.

The fabricated casing A is subjected to a heavy pressure in this primary mold C while the rubber is in an uncured state and still plastic, and the mold, core and material are all cold. Heating is not resorted to nor required at this stage of operations, as it is my aim to first form the tire with an unfinished bead before transferring the same to a second mold D which is used to compress the first product to its finished form while the rubber is still plastic and in an uncured state. In pressing the casing while cold in mold C the separate sides of the casing are stretched over core B toward the bead and base forming portions of the mold without buckling, wrinkling or folding the fabric or distorting it in any objectionable way because this primary mold is free from sharp bends in its bead forming surfaces and imposes no marked obstructions or irregularities tending to unduly stretch and strain the fabric in a single operation. The first step of compression is only intended to stretch the fabric and produce a bead corresponding roughly to its final contour approximately as shown within the borders of the dotted lines in Fig. 3, and the rounding off or shortening of rib 4 in the forming mold C, Fig. 1, provides a free passage for the bead in its downward movement during this first stretching operation, and allows the bead to be set up higher or three-eigths of an inch, instead of three-sixteenths of an inch as customarily practiced. Upon the completion of the first compressing step the mold C is removed from the press and opened, and the core B, together with the partly completed tire casing A, is transferred and placed within the second cast iron mold D. The molding cavity in the sections of mold D has approximately the same contour and dimensions as the molding cavity in the first mold C, excepting in its bead forming portions where the channel forming rib 8 is smaller and extends farther into the cavity than rib 4 in mold D. Moreover, the base or seat-forming portion 9 is deeper or farther away from the tread-forming portion of the tire casing in mold B as compared with mold C. Thus, the molding space between rib 8 of mold D and the sloping side 5 of core B is narrowed in comparison with the same space in mold C, while the channel or space between rib 8 and the base-forming portion 9 is somewhat deeper or greater in mold D than the corresponding channel or space in mold C. Therefore, when the partly formed casing is compressed within the second mold C, the fabric and rubber sides of the casing are stretched a second time in a slightly greater degree, and the material comprising the bead portion of the tire is given its finish and shape without subjecting the fabric to excessive strains. The shaping and smoothing action is more positive and certain in practicing the successive steps herein described in contradistinction to the former practice of producing such a beaded casing in a single operation. Furthermore, in the event any folds or imperfections are produced in the first molding operation, the second operation will generally iron out and remove such imperfections. Moreover, in transferring the partly finished casing from the first mold to the second mold an opportunity is given to examine and perceive any radical change and malformation and to correct the same before the second operation takes place. It should be understood in this connection that the first step takes place in a cold press, and that the second step takes place in a vulcanizing press where heat and pressure are imparted coincidently to the casing. When mold D is removed from the vulcanizing press the tire A' is a finished vulcanized product.

What I claim is:

1. A method of making tires, comprising the step of molding a built-up tire casing while cold to approximately its finished contour and dimensions and with a partly developed bead, and then molding and compressing and stretching the casing to a slightly greater degree while heating and vulcanizing the same and forming a finished bead.

2. A method of making tire casing having clencher beads, comprising the steps of building a tire casing of rubber and fabric upon an iron core and placing said core and casing together within a mold and pressing and molding the casing with partly finished bead portions, and then transferring said core and partly finished product to a second mold and compressing said bead portions in a greater degree and vulcanizing the casing in its finished form.

3. A method of making tire casing having clencher beads, comprising the step of compressing and stretching a built-up casing of fabric and rubber in a limited degree while producing a clencher bead roughly therein, and then stretching the beaded portion of the casing to a greater degree while shaping the bead to its finished contour under heat and pressure.

4. A method of making tire casing having locking beads, consisting in molding the fabricated casing with pressure but without heat until a partly finished bead is formed and then remolding said casing with pressure and heat until the bead is more sharply defined and finished.

Signed at Akron, in the county of Summit, and State of Ohio, this 29th day of Oct., 1920.

JAMES A. SWINEHART.